United States Patent
Daul

(10) Patent No.: US 8,113,076 B2
(45) Date of Patent: Feb. 14, 2012

(54) MECHANICAL POSITIONER FOR RECLINING SEAT ASSEMBLY

(75) Inventor: Terrance E. Daul, Hamburg, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 764 days.

(21) Appl. No.: 12/187,422

(22) Filed: Aug. 7, 2008

(65) Prior Publication Data

US 2010/0031761 A1    Feb. 11, 2010

(51) Int. Cl.
    *F16H 29/02*      (2006.01)
(52) U.S. Cl. ........................................ 74/89.39
(58) Field of Classification Search ................ 74/89.23, 74/89.37, 89.39; 188/2 D, 67, 77 R, 77 W; 297/362.11, 362.12, 362.14, 375
See application file for complete search history.

(56) References Cited

U.S. PATENT DOCUMENTS

| | | | |
|---|---|---|---|
| 2,860,521 A * | 11/1958 | Sierant | 74/89.38 |
| 3,477,486 A | 10/1967 | Modrey | |
| 5,005,677 A | 4/1991 | Bucholtz et al. | |
| 5,320,413 A * | 6/1994 | Griswold et al. | 297/362.12 |
| 5,429,217 A | 7/1995 | Stringer et al. | |
| 5,794,470 A | 8/1998 | Stringer | |
| 5,809,833 A * | 9/1998 | Newport et al. | 74/89.37 |
| 5,819,881 A | 10/1998 | Stringer | |
| 6,039,399 A | 3/2000 | Whalen et al. | |
| 6,322,146 B1 | 11/2001 | Fisher, Jr. | |
| 2006/0103212 A1* | 5/2006 | Waligora et al. | 297/362.14 |

FOREIGN PATENT DOCUMENTS

| | | |
|---|---|---|
| JP | 2000-152838 | 6/2000 |
| JP | 2001-137060 | 5/2001 |

OTHER PUBLICATIONS

International Search Report/Written Opinion for PCT Application No. PCT/US2009/052061; mailed Mar. 16, 2010; 6 pages.

* cited by examiner

*Primary Examiner* — Thomas R Hannon
*Assistant Examiner* — Phillip A Johnson
(74) *Attorney, Agent, or Firm* — Hiscock & Barclay, LLP

(57) ABSTRACT

A mechanical linear actuator having a tubular member that is defined by a housing for rotatably and axially supporting a circular nut, a lead screw is mated to the circular nut so that it can move axially in and out of the tubular member. A torsion spring clutch brake is wound about the circular nut to normally brake the nut and thus prevent the lead screw from moving into or out of the tubular member. An unlocking mechanism can remotely unwind the torsion spring clutch brake to sufficiently release the circular nut and thus allow the lead screw to pass in and out of the tubular member. An adjustable stop is provided for adjusting the stroke of the actuator.

20 Claims, 4 Drawing Sheets

MECHANICAL POSITIONER FOR RECLINING SEAT ASSEMBLY

FIELD OF THE INVENTION

The invention generally relates to the field of mechanical actuators and more specifically to a mechanical actuator assembly that can replace a hydraulic actuator as used, for example, in connection with a reclining seat apparatus.

BACKGROUND OF THE INVENTION

Reclining chair apparatus are commonly known, such as those presently used in the airline industry. Typically, seat adjustment or positioning mechanisms that are used in these apparatus include a hydraulic cylinder that provides a number of features including those that enable the seatback to be dynamically adjusted between an upright position and an infinite number of reclined positions.

It is has become desirable to provide a relatively less complex mechanical lock assembly that includes similar features as those that are presently found in hydraulic counterparts. These features may include unlimited position locking, infinite travel adjustment, and a manual override while providing for a smooth and controlled motion of the seat back.

SUMMARY OF THE INVENTION

Therefore and according to one version of the invention, there is provided a mechanical linear actuator comprising an elongated tubular member which is defined by an end housing having an axial through opening. An elongated lead screw is slidably contained within the opening having a male threaded section upon an outer surface thereof. A cylindrical drive nut is mounted for rotation within said housing that contains a female thread that mates with the male threaded portion on the lead screw so that the lead screw moves axially as the nut rotates within the housing. A spring loaded clutch brake engages the nut and acts to normally hold the nut in a first braked position wherein the nut is restrained from rotating in said housing and a second released position wherein the nut is free to rotate within said housing. A control mechanism is provided for manually moving the clutch brake between the first braked position and a second released position.

In one version of the invention, a manual override is provided that enables a reclined seat back on the chair to be brought to an upright position by someone who is not seated in the chair pushing the back rest toward the upright position.

In one version of the invention, the clutch brake is urged into a braked condition by a wrap spring and is moved to a release position by a remote push button mechanism that acts through a control cable to reposition a lever arm that is in contact with the wrap spring.

These and other features of the invention will become readily apparent from the following Detailed Description of the invention which is to be read in association with the accompanying drawings.

DETAILED DESCRIPTION

Figure 1:
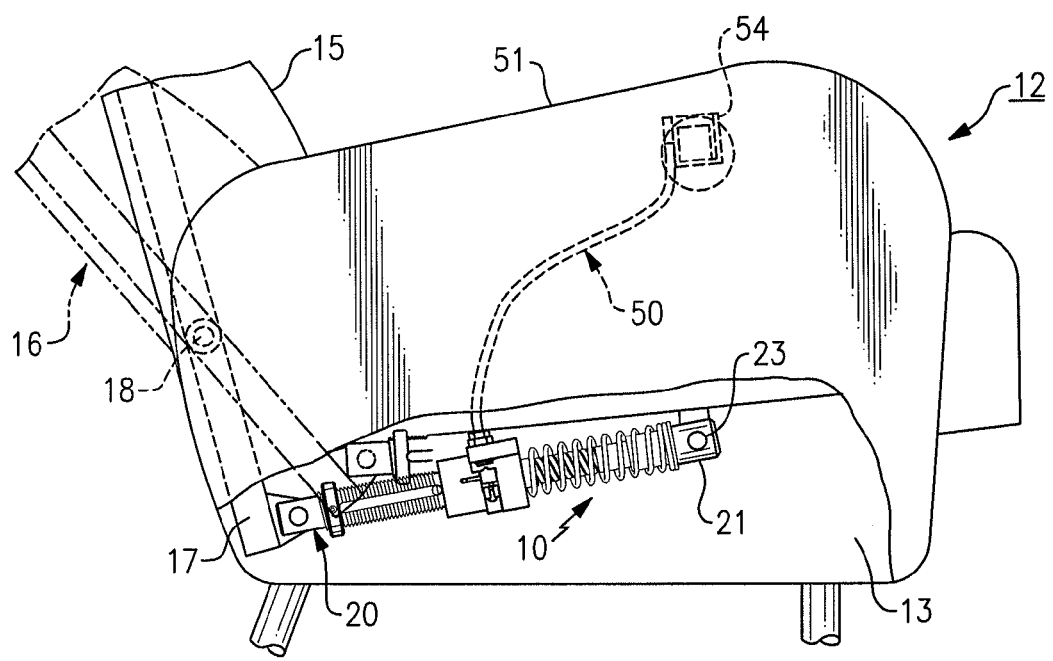
FIG. 1 is a partial side view with portions broken away of a reclining chair that contains a linear actuator that embodies the teachings of the present invention.

Referring initially to FIG. 1, there is illustrated a mechanical actuator, generally referenced 10, that is attached to a reclining chair 12 such as found on aircraft, buses, theater and the like wherein the positioning of which is controlled by a person that is seated in the chair. The chair typically contains a stationary seat 13 and an adjustable back rest 15 that is movably connected to the seat by means of a hinged linkage assembly 16. The linkage includes a back frame 17 that is rotatably coupled to the seat by means of a pivot pin 18. One end of the back frame is secured to the back rest while the opposite end of the back frame is pivotably connected to a first clevis 20 that is mounted at one end of the actuator 10. The opposing end of the actuator is also equipped with a second clevis 21 which in turn is pivotably coupled to the seat by a clevis pin 23. As will be explained in greater detail below, the actuator is capable of being stroked between a fully extended configuration wherein the back rest is in an upright position and a fully compressed position wherein the back rest is in a fully inclined position. The inclined position is shown in phantom outline in FIG. 1.

Figure 2:
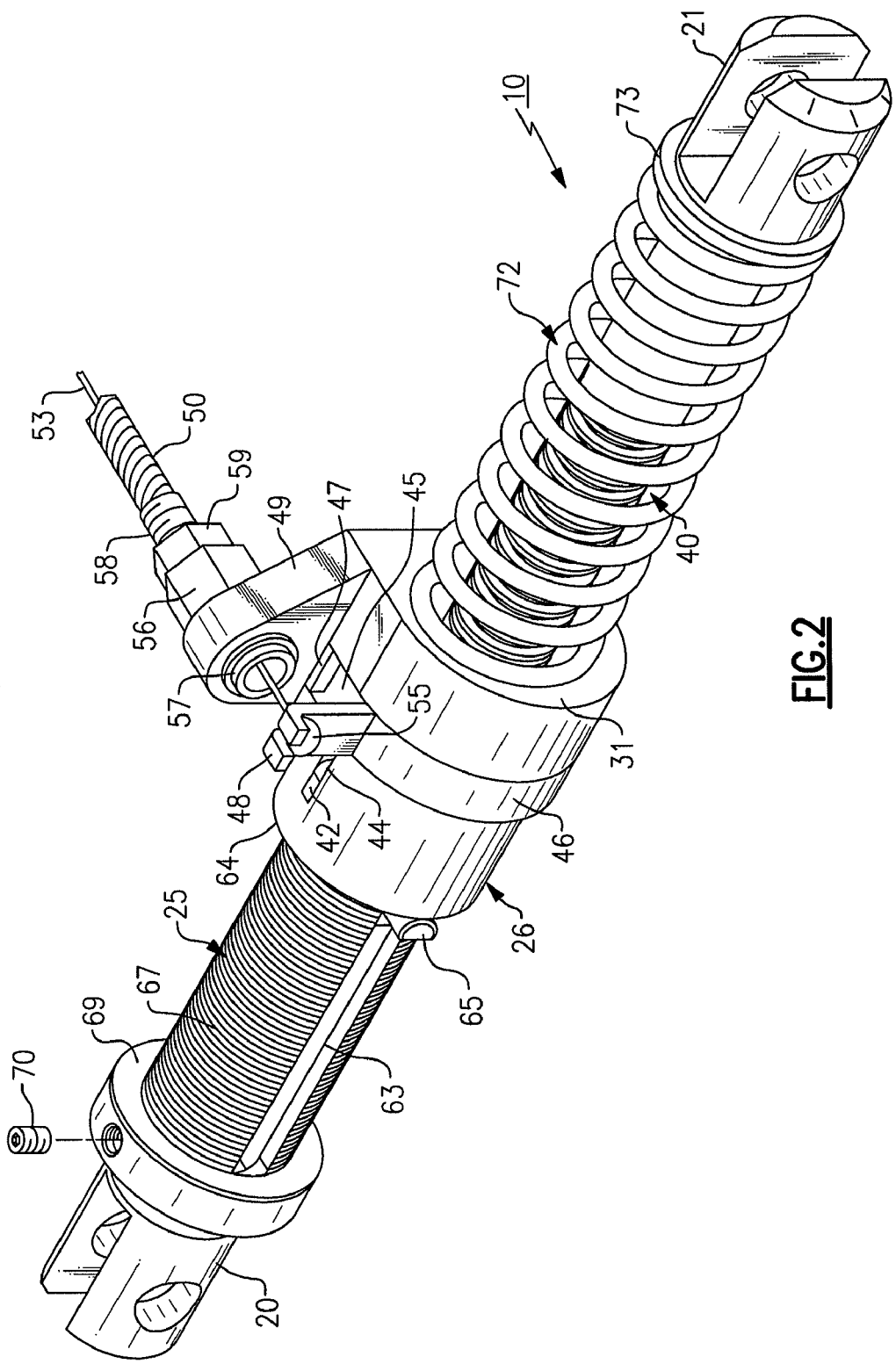
FIG. 2 is an enlarged perspective view of the linear actuator that is shown in FIG. 1.
Figure 3:
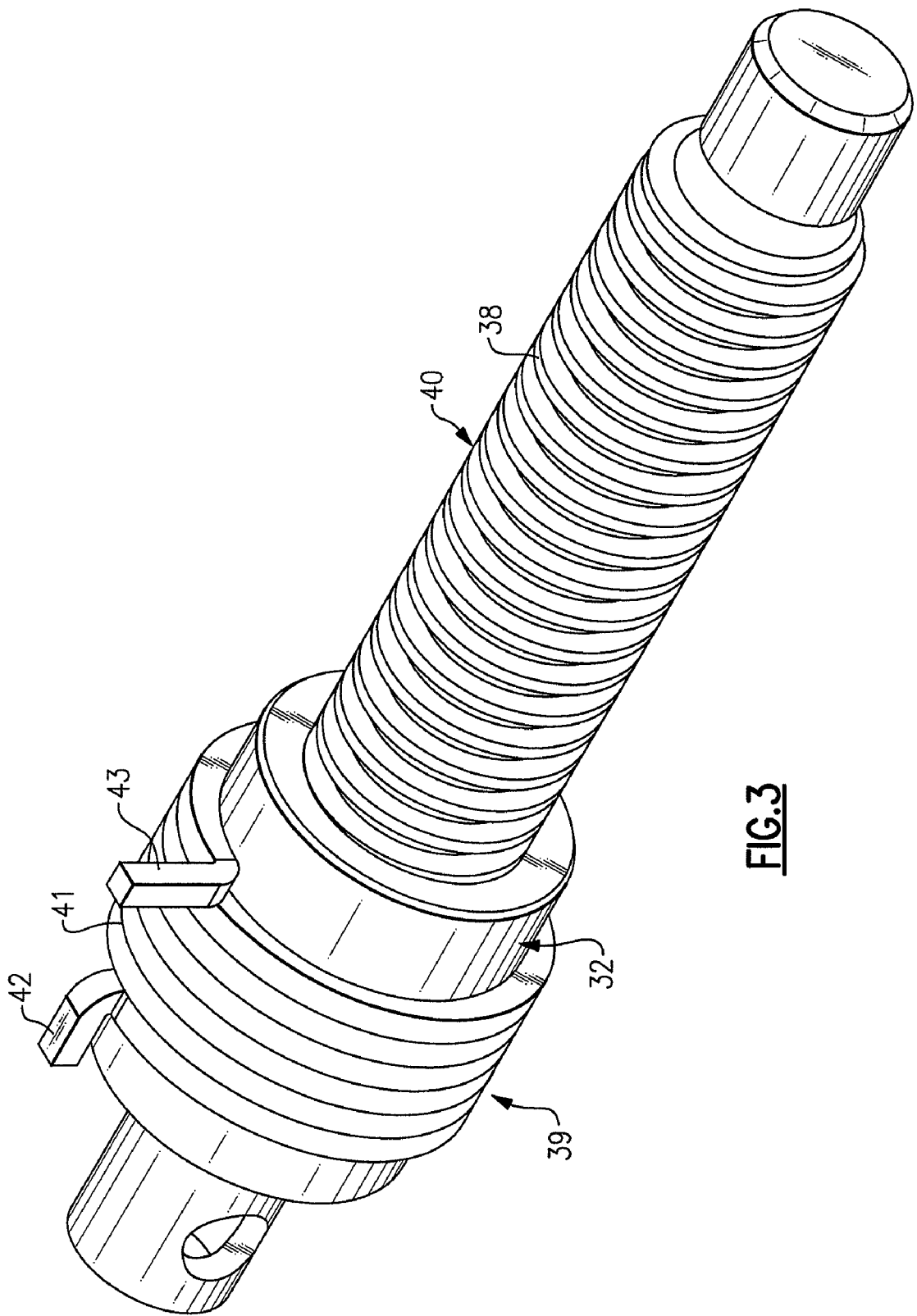
FIG. 3 is a further enlarged perspective view of a drive system subassembly utilized in the present actuator.
Figure 4:
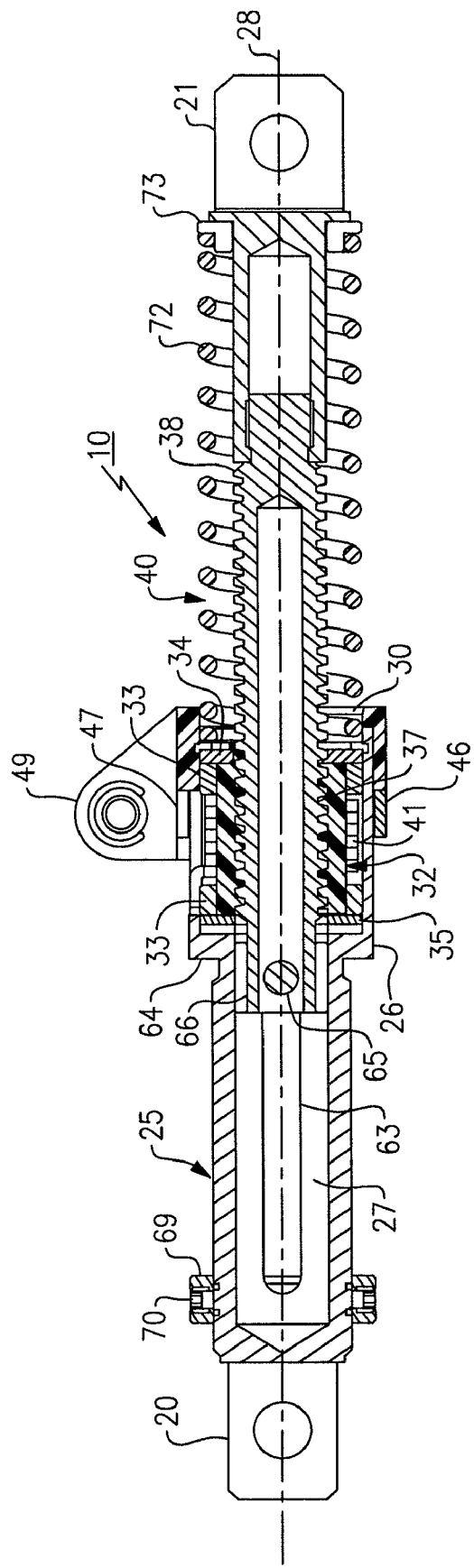
FIG. 4 is a side view in section of the present actuator.

Turning now more specifically to FIGS. 2-4, the mechanical actuator 10, which embodies the teachings of the present invention, is shown in greater detail. The actuator includes an elongated tubular member 25 that has a housing 26 supported at one end thereof. The tubing contains a blind hole 27 that is aligned along the axis 28 of the actuator and which extends substantially along the length of the tube 25. The blind hole opens into a radially expanded cylindrical chamber 30 within the housing which is coaxially aligned with the blind hole. The chamber, in turn, opens to the surrounding ambient through the outer end face 31 of the housing.

As best seen in FIG. 4, a cylindric drive nut 32 is contained within the chamber 30 so that it can freely rotate about axis 28 of the actuator. The outer surface of the nut is supported within the chamber by a pair of spaced apart circular bearings 33-33 that are fitted into the chamber 30 and which restrict the lateral movement of the drive nut. Washers 34 and 35 are also mounted within the housing chamber which, in turn, restrict the axial movement of the nut.

With further reference to FIG. 3, the cylindrical drive nut contains an internal female thread 37 that is arranged to mate with a male thread 38 that surrounds a major portion of the actuator lead screw 40. A torsional wrap spring 41 is wound about the outer surface of the cylindrical drive nut and serves as part of the clutch brake unit 39 in the assembly.

The wrap spring contains an axially extended tab 42 on the final turn at one end of the spring and a radially extended tab 43 that is contained on the final turn of the spring at the opposite end thereof. As shown in FIG. 2, the housing 26 is provided with an axially disposed cutout 44 that is arranged to capture the end tab 42 of the wrap spring to prevent the tab from moving in a circumferential direction. The opposing end tab 43 is contained within a circumferential opening 45 that is formed in the housing and which permits the tab to move circularly within the opening. A collar 46 encircling the housing contains a raised lever arm 48 against which tab 43 rides in contact. The collar is held in the assembly within a circular groove 47 formed in the underside of a bracket 49 that is mounted upon the housing. Lever arm 48 is located adjacent to the bracket 49. The bracket contains a flexible hollow cable 50 which passes upwardly through the arm rest 51 of the chair 12 (FIG. 1). The cable slidably contains a length of control wire 53, one end of which is connected to a control button 54 which is mounted on the inside of the chair arm rest 51. The opposite end 55 of the cable is attached to the lever arm 48. When the control button is actuated, the lever arm is pulled in a clockwise direction by the cable which, in turn, causes the tab 43 to rotate in the same direction. This action releases the cylindrical drive nut 32 allowing the nut to rotate freely within the housing.

The cable contains a hex head nut 56 that is rotatably supported within the bracket 49 upon a circular pivot 57. The nut further contains an internal thread that mates with a threaded shank 58 mounted upon the end of the cable. Accordingly by turning the hex head nut 56, the position of the hollow cable 50 can be preset to limit the movement of the control wire 53. A lock nut 59 is also mounted upon the threaded shank 58 which prevents the adjusting screw from rotating once the control wire has been selectively positioned within the bracket.

As noted above with reference to FIG. 1, compressing the axial length of the actuator will cause the back rest of the chair to be tilted back about pivot 18 from its home or upright position. Accordingly, the back rest can be brought to an infinite number of positions within the stroke limit of the actuator. The stroke limit is dictated by how far the lead screw 40 can travel into the blind hole 27 that is contained within the aligned tubular member 25. The tubular member contains a pair of opposed linear slots 63 that are formed in the sidewall of the tube. Each slot is axially aligned with the axis 28 of the actuator and extends along the tube to substantially the same length. The left hand end of the lead screw as viewed in FIG. 4 has a reduced section 66 into which a pin 65 is press fitted. The pin, in assembly, passes through both of the slots in the tubular member and is seated in arresting contact with the end face 64 of the housing 26 when the lead screw is in its fully extended position (see FIG. 2). The outer surface of the tubular member contains a male thread 67 that is coextensive with the slots 63 and a circular stop nut 69 is threadably mounted thereon. The stop nut thus can be moved to an infinite number of positions along the threaded section of the tubular member 26. The pin 65 has a length such that it extends outwardly through both slots so that it will arrest against the stop nut as the lead screw moves into the tubular member. As should be now evident, the axial distance between the end face 64 of the housing 26 and the location of the stop determines the compressive limit of the actuator and thus the amount of incline afforded the back rest of the chair. At least one set screw 70 is threaded into the stop nut which serves to lock the stop nut against the tubular member when the nut is placed in a desired location.

A helically wound compression spring 72 encircles the exposed length of the lead screw. The spring is adapted to act between the raised flange 73 on clevis 21 and the end face 31 of housing 26. As can be seen, the spring becomes compressed as the lead screw moves into the tubular member and thus provides a force that urges the actuator to its fully extended home position.

In operation, a person seated in the chair simply has to activate the control button which unwraps the wrap spring, which frees the circular nut so it can rotate freely within the housing on the tubular member section of the actuator. A slight rearward pressure by the occupant upon the back rest causes the lead screw to move axially through the nut into the tubular member. At this time the lead screw acts as a driver to turn the nut in place as it moves through the housing. When a desired tilt position is reached, the control button is released and the wrap spring locks the drive nut in place preventing further movement of the back rest. To return the back rest to its home or upright position, the chair occupant has only to reactuate the control button releasing the holding pressure of the clutch brake and allow the compression return spring to return the back rest to the home position. The stop nut arrangement on the tubular member further limits the stroke of the actuator and can be quickly and easily adjusted. Accordingly, chairs equipped with the present actuator can be readily adapted for placement within a wide range of location having varied space limitations. By the same token, the control button mechanism can also be easily adjusted to unwrap the wrap spring and thus release the drive nut. Accordingly, the actuator can be rapidly and conveniently set up and installed either in the factory or in the field without need of special tools or the like.

The present actuator is also provided with a manual override feature that permits the unit to be returned to a fully extended position when the clutch brake is holding the unit in a compressed position. The drive nut is arranged to rotate in a counter-clockwise direction as the lead screw advances axially to compress the unit. The torsional wrap spring of the clutch brake is wound about the drive nut so that it will strengthen its hold upon the nut as the lead screw places a torque upon the drive nut that wants to drive the drive nut in a counter-clockwise direction. By the same token, the lead screw will turn the drive nut in the opposite or clockwise direction as the unit is extended. This, in turn, causes the wrap spring of the clutch brake to want to partially unwrap and release the drive nut. The amount of press-fit between the wrap spring and the drive nut determines how much rotational force will be required to unwrap the wrap spring and release the drive nut. This rotational force along with the lead screw pitch determines the axial force required to extend the unit. When the present actuator is employed in a reclining chair embodiment, the actuator override release force is generally set at about 20 pounds greater than the maximum output force of the compression spring. This amount of force can be easily generated through the chair linage by an average size person (flight attendant or the like) with little exertion by simply pushing a reclined seat back forward toward its upright position.

While the invention has been described with reference to a preferred embodiment, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A mechanical linear actuator that includes:
   a housing having an opening that extends axially through said housing;
   an elongated lead screw that is slidably contained within said opening, said lead screw having a male threaded section upon the outer surface thereof;
   a cylindrical drive nut mounted for rotation within said housing, said cylindrical nut having an axial outer diameter and a female thread that mates with said male thread on said lead screw so that said lead screw can move axially within said opening as said cylindrical nut rotates within said housing;
   a spring clutch brake for engaging said axial outer diameter of said cylindrical drive nut when said spring clutch brake is in a first position to restrain said drive nut from rotating and for releasing said cylindrical drive nut when in a second release position wherein said cylindrical drive nut can freely rotate within said housing; and said spring clutch brake being manually movable between said first and second positions.

2. The actuator of claim 1 that includes a stroke limiting device.

3. The actuator of claim 2 that includes an adjustable stroke limiting device.

4. The actuator of claim 2 that includes a lockable stroke limiting device.

5. The actuator of claim 1 that further includes a first coupler located at a free end of said housing and a second coupler located at a free end of said lead screw.

6. The actuator of claim 5 wherein one of said couplers rotatably connects one end of said actuator to the stationary seat of a chair having a reclining back rest and the other of said couplers connect the other end of said actuator to linkage for reclining said back rest so that said back rest moves from a fully upright position to a reclined position as the length of the actuator is compressed.

7. The actuator of claim 1 that further includes a spring for urging said spring clutch brake into said first position.

8. The actuator of claim 1 which includes a tubular member on the end of the housing which includes at least one slotted opening that extends axially along a length of said tubular member and a guide pin secured in said lead screw that passes outwardly through said at least one slotted opening whereby said guide pin rides in said at least one slotted opening when the lead screw moves within said tubular member.

9. The actuator of claim 8 wherein said tubular member contains a threaded section upon its outer surface which is substantially coextensive in length with said at least one slotted opening.

10. The actuator of claim 9 that further includes a stop nut threadably mounted upon said threaded section of said tubular member which intercepts the progress of said guide pin as said lead screw advances into said tubular member thus limiting the axial travel of said lead screw.

11. The actuator of claim 10 that further includes at least one set screw that is threaded radially into said stop nut to contact said outer surface of said tubular member and secure said stop nut in a desired location.

12. The actuator of claim 11 wherein said tubular member contains a pair of parallelly aligned slotted openings and said guide pin passes outwardly through each of said openings to intercept said stop nut.

13. The actuator of claim 1 wherein said spring brake clutch includes a torsional spring that is wound about the outer diameter of said cylindrical nut.

14. The actuator of claim 13 wherein said torsional spring includes an axially disposed first tab at one end of said torsional spring and a second radially disposed tab at the other end of said torsional spring.

15. The actuator of claim 14 wherein said first tab is contained within an axially aligned cutout in said housing so as to prevent said first tab from moving circumferentially within said housing and said second tab passes through a circumferential opening in said housing to permit the second tab to rotate between a first position wherein the spring clutch brake locks said drive nut against further rotation and a second position wherein said spring clutch brake unlocks said drive nut for free rotation within said housing.

16. The actuator of claim 15 that further includes a lever arm that acts against said second tab to urge said second tab into said second position when manually moving spring clutch brake between said first and second positions.

17. The actuator of claim 16 that further includes a control means for remotely moving said second tab from said first position into said second position.

18. The actuator of claim 1 wherein said spring clutch brake includes a torsional spring that is wound about said drive nut in a direction such that the holding force of said spring clutch brake increases its hold on said drive nut as the actuator is loaded in one direction, and decreases its holding force on said drive nut as the actuator is loaded in the other direction; said holding force on drive nut can be overridden by manually forcing said actuator in said other direction.

19. The actuator of claim 1 that includes a compression spring that extends the actuator when said spring clutch brake is in the second release position.

20. A mechanical linear actuator comprising:

a housing having an opening that extends axially through said housing:

an elongated lead screw that is slidably contained within said opening, said lead screw having a male threaded section upon the outer surface thereof;

a cylindrical drive nut mounted for rotation within said housing, said cylindrical nut having an axial outer diameter and a female thread that mates with said male thread on said lead screw so that said lead screw can move axially within said opening as said cylindrical nut rotates within said housing;

a spring clutch brake for engaging said axial outer diameter of said cylindrical drive nut when said spring clutch brake is in a first position to restrain said drive nut from rotating and for releasing said cylindrical drive nut when in a second release position wherein said cylindrical drive nut can freely rotate within said housing, said spring clutch brake being manually movable between said first and second positions, said spring brake clutch including a torsional spring that is wound about an axial portion of the outer diameter of said cylindrical nut wherein said torsional spring further includes an axially disposed first tab at one end of said torsional spring and a second radially disposed tab at the other end of said torsional spring, said first tab being contained within an axially aligned cutout in said housing so as to prevent said first tab from moving circumferentially within said housing and said second tab passes through a circumferential opening in said housing to permit the second tab to rotate between a first position, wherein the spring clutch brake locks said drive nut against further rotation and a second position wherein said spring clutch brake unlocks said drive nut for free rotation within said housing.

\* \* \* \* \*